No. 821,822. PATENTED MAY 29, 1906.
E. NOOTBAAR.
DEVICE FOR HOLDING EXPANDED UMBRELLAS.
APPLICATION FILED AUG. 17, 1904.

Witnesses:—
C. H. Heining
Gustav Heyde

Inventor:—
Ernst Nootbaar
by Paul Schilling
his attorney

UNITED STATES PATENT OFFICE.

ERNST NOOTBAAR, OF DRESDEN, GERMANY.

DEVICE FOR HOLDING EXPANDED UMBRELLAS.

No. 821,822.  Specification of Letters Patent.  Patented May 29, 1906.

Application filed August 17, 1904. Serial No. 221,105.

*To all whom it may concern:*

Be it known that I, ERNST NOOTBAAR, a subject of the German Emperor, and a resident of Dresden, Germany, have invented certain new and useful Improvements in Devices for Holding Expanded Umbrellas, of which the following is a specification.

It is a matter of much inconvenience to hold an expanded umbrella when sitting in an open carriage, motor-car, or other vehicle, since the arm becomes tired, especially when driving against the wind. It is also troublesome to have to hold the umbrella when one is driving oneself or when employing a telescope or reading or otherwise using the hands.

My invention relates to a device whereby the inconvenience in question is overcome and which on account of its practical character and ready adaptability can be employed everywhere with the greatest advantage.

The new device securely holds the umbrella and enables it to be fixed in any position at any desired angle—erect, inclined forward to protect the face or rearward to shelter the back, or in any other manner.

The device may be employed not only in the interior of the vehicle, but also on the driver's seat.

It may also be used by cyclists, or when sitting out of doors it can be fixed to the chair or bench or to a support stuck in the ground.

Several forms of the invention are shown in the accompanying drawings, in which—

Figure 1:
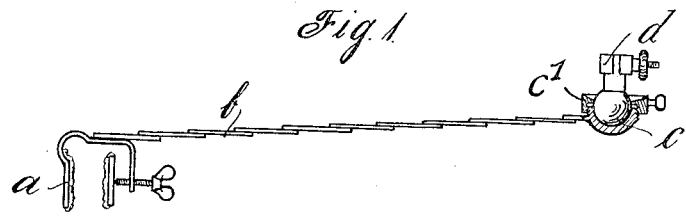
Figure 2:
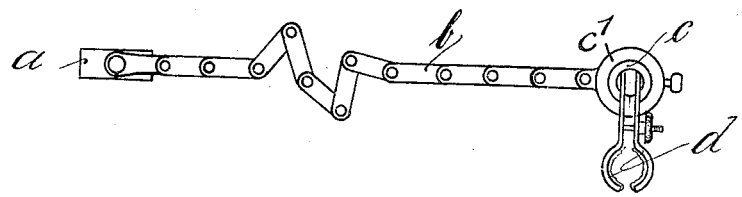
Figure 3:
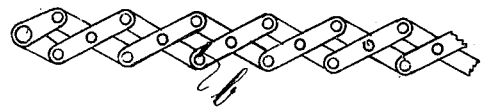
Figure 4:
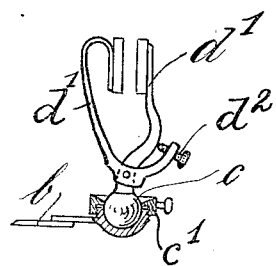
Figure 5:

Figure 1 is an elevation of one form of the device. Fig. 2 is a plan view of Fig. 1. Fig. 3 is a plan view showing a modified form of the arm. Fig. 4 illustrates an alternative form of holder for gripping the umbrella. Fig. 5 illustrates a second form of device for securing the arm to the vehicle or the like.

$a$ is a clamp which can be secured to the lining of the vehicle or to any suitable edge or the like. The clamp-jaws may be cushioned, if desired, to prevent injury to the gripped parts. Projecting from the clamp $a$ is an arm $b$ of any suitable length, consisting of a number of links pivoted together. Figs. 1 and 2 show an arm formed of a succession of simple links. In Fig. 3 the arm is composed of a pair of lazy-tongs. At the other end of the arm $b$ is a ball-and-socket joint $c$, the ball of which carries the actual holder $d$ for the umbrella. Any desirable form of holder may be used. Figs. 1 and 2 show a pair of spring-jaws $d$, while Fig. 4 shows a pair of tongs $d'$ with press-screw $d^2$. The socket in which the ball works is provided with a screw-ring $c'$, by tightening of which the ball may be retained in any desired position.

In place of a clamp $a$ a spring-clip $e$, Fig. 5, may be provided or any other suitable holding device adapted. In the same manner I would have it understood that I in no wise limit myself to the precise illustrated constructions of the individual members—that is to say, of the arm and umbrella-holder—since these may be of any appropriate form; but

What I claim as new is—

A device of the character described, comprising a clamp, an arm secured thereto, said arm comprising a plurality of links pivoted together, a cup secured on the outer end of said arm and being provided with a concaved socket, a ball arranged in said socket, an integral arm extending from said ball, a second arm pivoted thereto, and having a rearwardly-extending portion, and a set-screw carried by said rearwardly-extending portion and bearing against the first-named arm.

In testimony that I claim the foregoing as my invention I have signed my name in presence of two subscribing witnesses.

ERNST NOOTBAAR.

Witnesses:
THEODORE HABELMAN,
ERDA NOOTBAAR.